(12) United States Patent
Lee et al.

(10) Patent No.: US 8,099,666 B2
(45) Date of Patent: Jan. 17, 2012

(54) METHOD AND APPARATUS FOR PROVIDING USER INTERFACE FOR MULTISTREAMING AUDIO CONTROL

(75) Inventors: Kyung-ju Lee, Suwon-si (KR);
Jin-hyong Kim, Yongin-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1621 days.

(21) Appl. No.: 11/222,981

(22) Filed: Sep. 12, 2005

(65) Prior Publication Data
US 2006/0069458 A1 Mar. 30, 2006

(30) Foreign Application Priority Data

Sep. 24, 2004 (KR) .................. 10-2004-0077192

(51) Int. Cl.
*G06F 3/16* (2006.01)
(52) U.S. Cl. ......... 715/727; 715/723; 715/808; 715/708
(58) Field of Classification Search .................. 715/723, 715/727, 808, 708
See application file for complete search history.

(56) References Cited

U.S. PATENT DOCUMENTS

| | | | |
|---|---|---|---|
| 5,345,550 A * | 9/1994 | Bloomfield | 715/841 |
| 5,542,039 A | 7/1996 | Brinson et al. | |
| 5,740,436 A | 4/1998 | Davis et al. | |
| 5,886,699 A * | 3/1999 | Belfiore et al. | 715/843 |
| 5,910,996 A * | 6/1999 | Eggers et al. | 381/107 |
| 6,009,519 A | 12/1999 | Jones et al. | |
| 6,011,495 A * | 1/2000 | Chen | 341/22 |
| 6,081,266 A * | 6/2000 | Sciammarella | 715/727 |
| 6,611,537 B1 * | 8/2003 | Edens et al. | 370/503 |
| 7,190,794 B2 * | 3/2007 | Hinde | 381/17 |
| 7,325,199 B1 * | 1/2008 | Reid | 715/723 |
| 7,716,588 B2 * | 5/2010 | Iwamura | 715/736 |
| 2002/0002039 A1 * | 1/2002 | Qureshey et al. | 455/344 |

FOREIGN PATENT DOCUMENTS

| | | |
|---|---|---|
| EP | 1124175 A2 | 8/2001 |
| JP | 11-242484 | 9/1999 |
| JP | 2002-369163 | 12/2001 |
| KR | 2002-0003785 | 1/2002 |

OTHER PUBLICATIONS

Rogue Amoeba Software, LLC. "SoundSource Sophisticated Sonic Selection". Aug. 11, 2003. http://www.rogueamoeba.com/freebies/.*
Intel Corporation, High Definition Audio Specification, Revision 1.0, Apr. 15, 2004, 1-174.
European Search Report for European Patent Application No. 05108262.6 dated Oct. 6, 2011 (in English).

* cited by examiner

*Primary Examiner* — Michael Roswell
(74) *Attorney, Agent, or Firm* — Staas & Halsey LLP

(57) ABSTRACT

Provided is a method and apparatus for providing a user interface for multistreaming audio control. The method includes determining whether a multistreaming mode of an audio device is activated upon receiving from a user a command to execute a popup menu for content, providing play menu items of audio panels to the popup menu for the content if the multistreaming mode is activated, and playing the content through an audio panel selected by the user.

10 Claims, 10 Drawing Sheets

METHOD AND APPARATUS FOR PROVIDING USER INTERFACE FOR MULTISTREAMING AUDIO CONTROL

CROSS-REFERENCE TO RELATED APPLICATION

This application claims the benefit of Korean Patent Application No. 10-2004-0077192, filed on Sep. 24, 2004 in the Korean Intellectual Property Office, the disclosure of which is incorporated herein by reference in its entirety.

BACKGROUND OF THE INVENTION

1. Field of the Invention

The present invention relates generally to multistreaming audio. More particularly, embodiments of the present invention relate to a user interface for multistreaming audio control.

2. Description of the Related Art

Advances in digital technology and multimedia technology have allowed people to enjoy unprecedented high-definition (HD) video and audio.

Audio technology has evolved from mono audio into stereo audio and from stereo audio into multichannel audio. Such evolution allows us to enjoy more realistic audio. Multistreaming audio is a recent audio technology and much research has been conducted in this field.

HD Audio, recently released by Intel Corporation, is an audio interface that replaces conventional audio architectures such as AC'97, and provides functions for multistreaming.

FIG. 1 is a block diagram illustrating a configuration of a computer for conventional multistreaming audio. The computer includes a central processing unit (CPU) 110, a memory controller 120, a memory 130, and a HD audio controller 140. The CPU 110 and the memory controller 120 are connected through a host bus, and the memory controller 120 and the memory 130 are connected through a memory bus. The memory controller 120 and the HD audio controller 140 are connected through a system bus, e.g., a peripheral component interface (PCI) bus.

The HD audio controller 140 is connected to a plurality of HD audio codecs 150 through an audio bus and provides multistreaming audio service. Converters 160 convert an analog audio signal into a digital audio signal and transmit the digital audio signal to the HD audio codecs 150 or receive a digital audio signal from the HD audio codecs 150 and convert the received digital audio signal into an analog audio signal. The HD audio codecs 150 compress a digital audio signal through digital compression or decompress compressed digital audio data into a digital audio signal.

FIG. 2 is a block diagram of a computer system having two audio panels. The computer 200 has two audio panels; a front panel 210 and a rear panel 220. The front panel 210 provides an audio terminal on the front of a case of the computer 200. A user may connect an earphone, a headphone, or other output device to the audio terminal provided by the front panel 210 to listen to audio content, such as music or news. The rear panel 220 provides an audio terminal on the rear of the case of the computer 200. The audio terminal provided on the rear panel 220 may be connected to a speaker or other output device.

Since multistreaming is provided in the computer 200, the user can listen to reproduced audio files through the front panel 210 and/or the rear panel 220. For example, while the audio of a film is being output through a speaker connected to the rear panel 220, the user may listen to music through a headphone connected to the front panel 210.

To enjoy multistreaming sound, users usually have to go through complex procedures. For example, to run content through different panels in a computer using a Windows operating system (OS), a user must perform a number of complex operations. The user first opens a control panel and then double-clicks on a sound and audio device icon with a mouse to open a sound and audio device configuration window. After clicking on an audio tab in the sound and audio device configuration window with the mouse, the user selects a default device from a sound play menu among menus provided in the audio tab. The default device may be a rear panel audio and a front panel audio. If the user desires to listen to contents through the rear panel audio, the user selects the rear panel audio. If the user desires to listen to contents through the front panel audio, the user selects the front panel audio. Such a complicated setting procedure may discourage users from using multistreaming.

SUMMARY OF THE INVENTION

An aspect of the present invention provides a method of and apparatus for providing a convenient user interface for multistreaming audio control.

According to an aspect of the present invention, there is provided a method of providing a user interface for multistreaming audio control. The method includes determining whether a multistreaming mode of an audio device is activated, upon receiving a command to execute a content popup menu for content from a user, providing play items of audio panels to the popup menu for the content if the multistreaming mode is activated, and playing the content through an audio panel selected by the user.

According to another aspect of the present invention, there is provided a method of providing a user interface for multistreaming audio control, the method including determining whether a multistreaming mode of an audio device is activated upon receiving from a user a command to execute a popup menu for content, providing play menus of audio panels to the popup menu for the content if the multistreaming mode is activated, and displaying a play program of the content on a monitor mapped to an audio panel selected by the user.

According to still another aspect of the present invention, there is provided a method of providing a user interface for multistreaming audio control, the method including determining on which monitor among a plurality of monitors a content icon is displayed once a user issues a play command for content using the content icon, checking an audio panel that is mapped to the monitor on which the content icon is displayed, and playing the content through the audio panel.

According to a further aspect of the present invention, there is provided a method of providing a user interface for multistreaming audio control, the method including determining whether an audio panel mapped to a hot key that controls the audio panel is in an active state once a user presses the hot key, and deactivating the audio panel if the audio panel is in the active state and activating the audio panel if the audio panel is in an inactive state.

According to yet another aspect of the present invention, there is provided a keyboard including a key button module which includes a plurality of key buttons and at least one hot key button to control an audio panel, a keyboard controller which generates a key signal corresponding to a key button pressed by a user, and a network interface which communicates with a computer, wherein when a user presses one of the hot key buttons, a hot key signal to control the audio panel is transmitted to the computer.

According to still yet another aspect of the present invention, there is provided a computer system including a keyboard which includes key buttons including a hot key button to control an audio panel, and a user interface which determines whether the audio panel mapped to the hot key that controls the audio panel is in an active state once a user presses the hot key, deactivates the audio panel mapped to the pressed hot key if the audio panel is in the active state, and activates the audio panel mapped to the pressed hot key if the audio panel is in an inactive state.

Additional aspects and/or advantages of the invention will be set forth in part in the description which follows and, in part, will be apparent from the description, or may be learned by practice of the invention.

BRIEF DESCRIPTION OF THE DRAWINGS

These and/or other aspects and advantages of the invention will become apparent and more readily appreciated from the following description of the embodiments, taken in conjunction with the accompanying drawings of which.

DETAILED DESCRIPTION OF THE PREFERRED EMBODIMENTS

Figure 1:
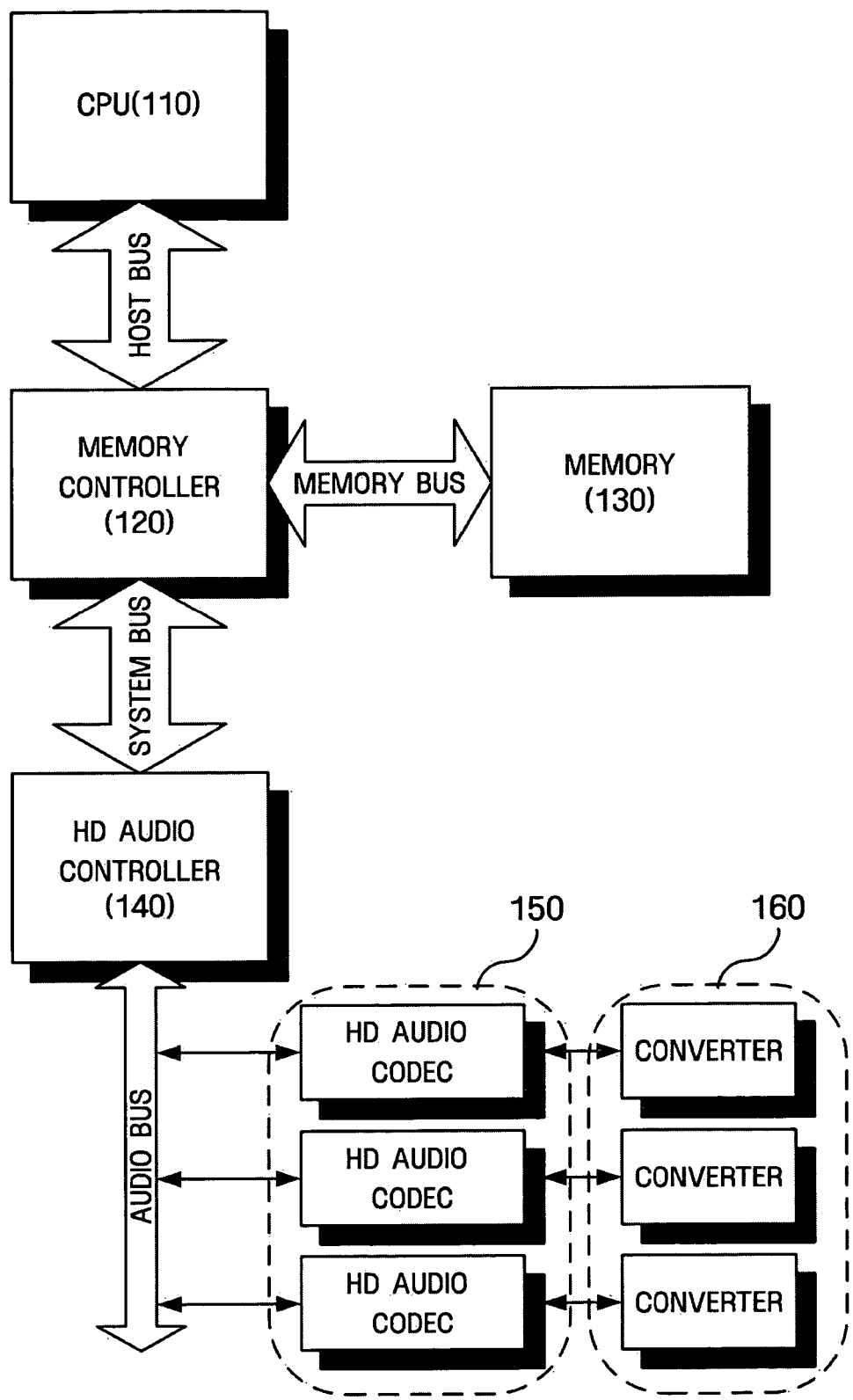
FIG. 1 is a block diagram illustrating a configuration of a computer for conventional multistreaming audio.
Figure 2:
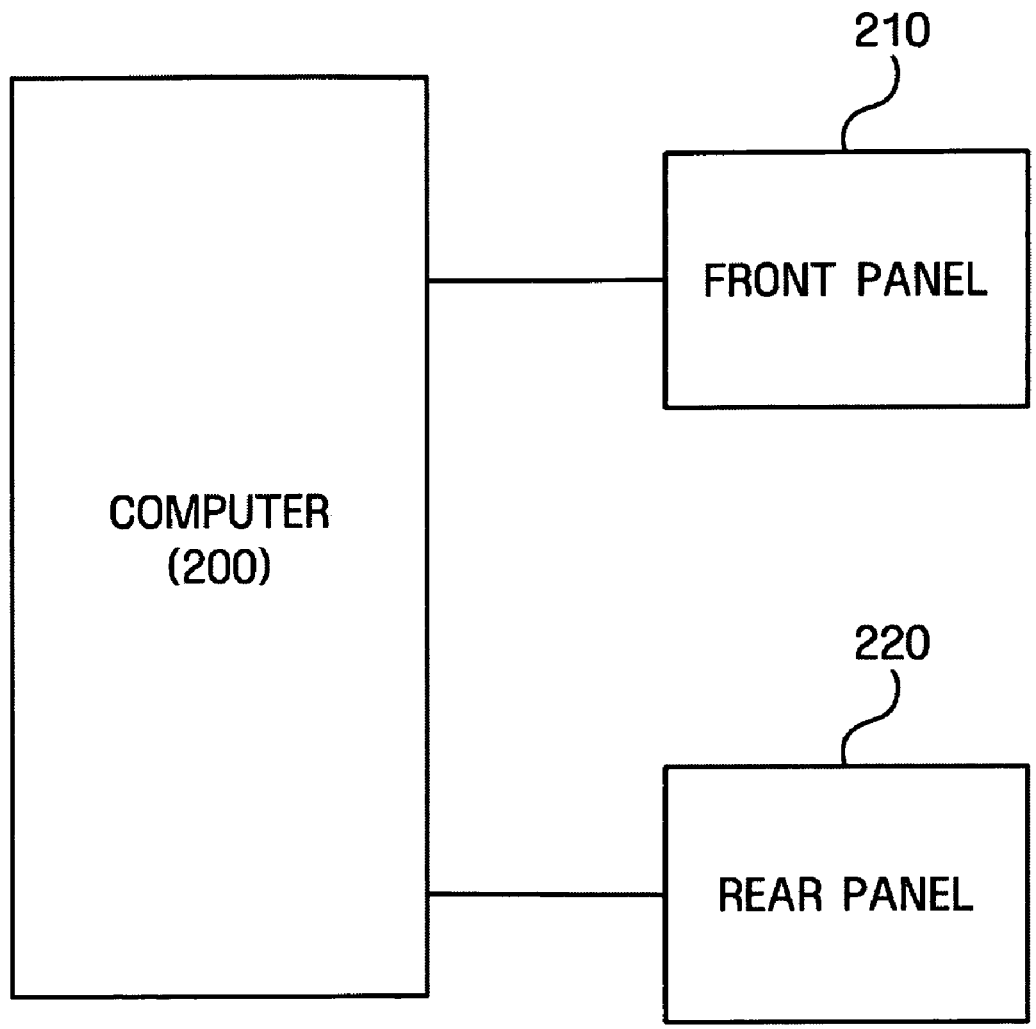
FIG. 2 is a block diagram of a computer system having two audio panels.

Reference will now be made in detail to the embodiments of the present invention, examples of which are illustrated in the accompanying drawings, wherein like reference numerals refer to the like elements throughout. The embodiments are described below to explain the present invention by referring to the figures.

Preferred embodiments of the present invention will now be described in detail with reference to the accompanying drawings. In the following embodiments, a description will be made particularly regarding a multistreaming audio device having two audio panels (a front panel and a rear panel), but such a configuration is only an example. Thus, a multistreaming audio device having more audio panels should be construed to fall within the spirit of the present invention.

Figure 3:
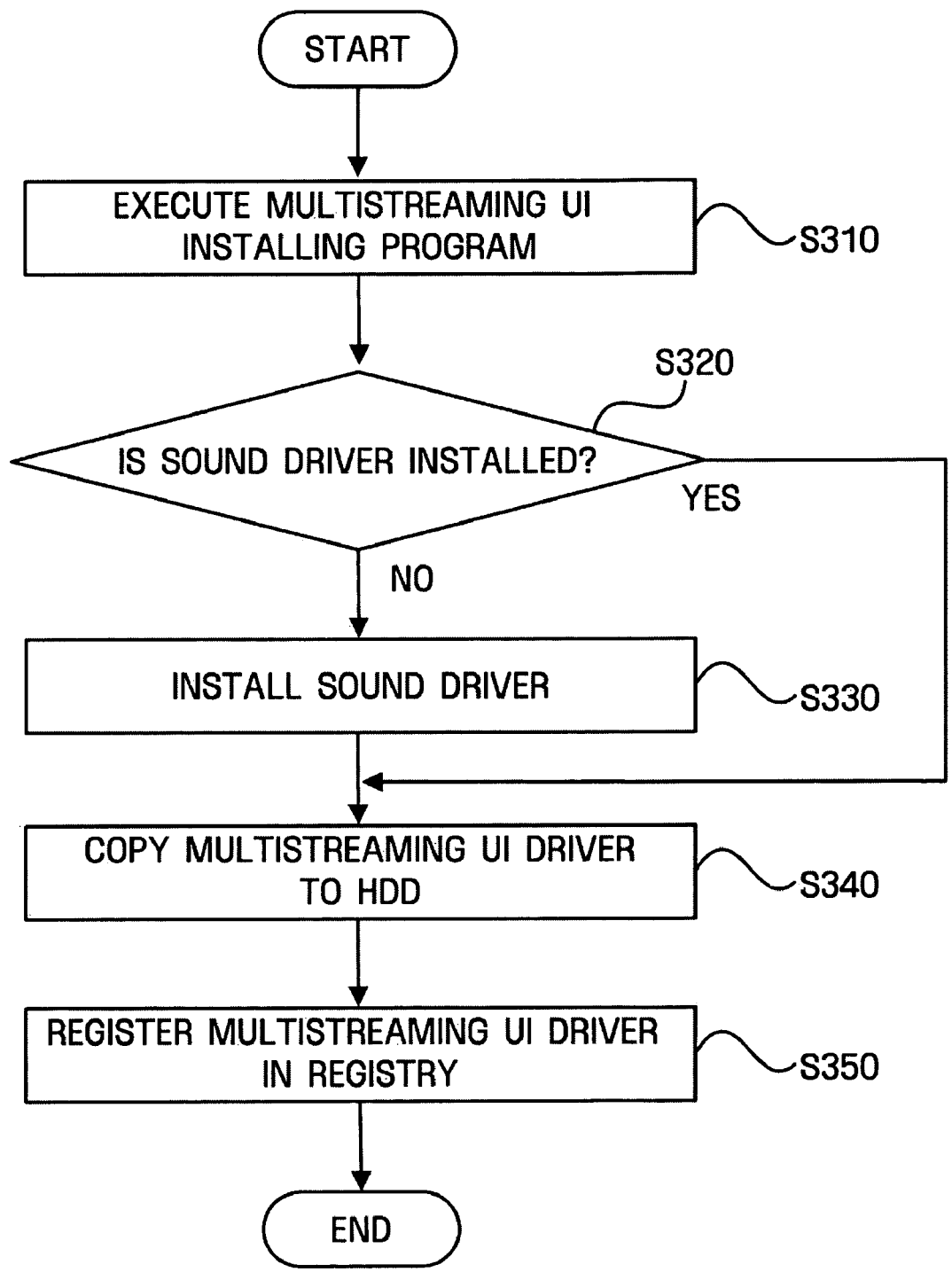
FIG. 3 is a flowchart of a process of installing a user interface for multistreaming audio control according to an exemplary embodiment of the present invention.

FIG. 3 is a flowchart of a process of installing a user interface for a multistreaming audio control according to an exemplary embodiment of the present invention.

First, a multistreaming user interface installing program is executed in operation S310. The multistreaming user interface installing program helps the user to install the multistreaming user interface on a computer.

The multistreaming user interface installing program determines whether a sound driver that supports multistreaming audio is installed in operation S320. If the sound driver is not installed, it is installed on the computer in operation S330 with the help of the multistreaming user interface installing program. According to an exemplary embodiment of the present invention, the multistreaming user interface installing program displays a message saying "Install sound driver" on a monitor, so that the user installs the sound driver. According to another embodiment of the present invention, the multistreaming user interface installing program searches for a position where to store the sound driver for direct installation of the sound driver. If the sound driver is already installed, operation S330 is skipped.

After installing the sound driver, the multistreaming user interface installing program copies a user interface driver to a hard disk drive (HDD) in operation S340. The multistreaming user interface installing program registers a multistreaming user interface driver in a registry in operation S350.

Examples of a popup menu provided by the installed multistreaming user interface will be described with reference to FIG. 4.

Figure 4:
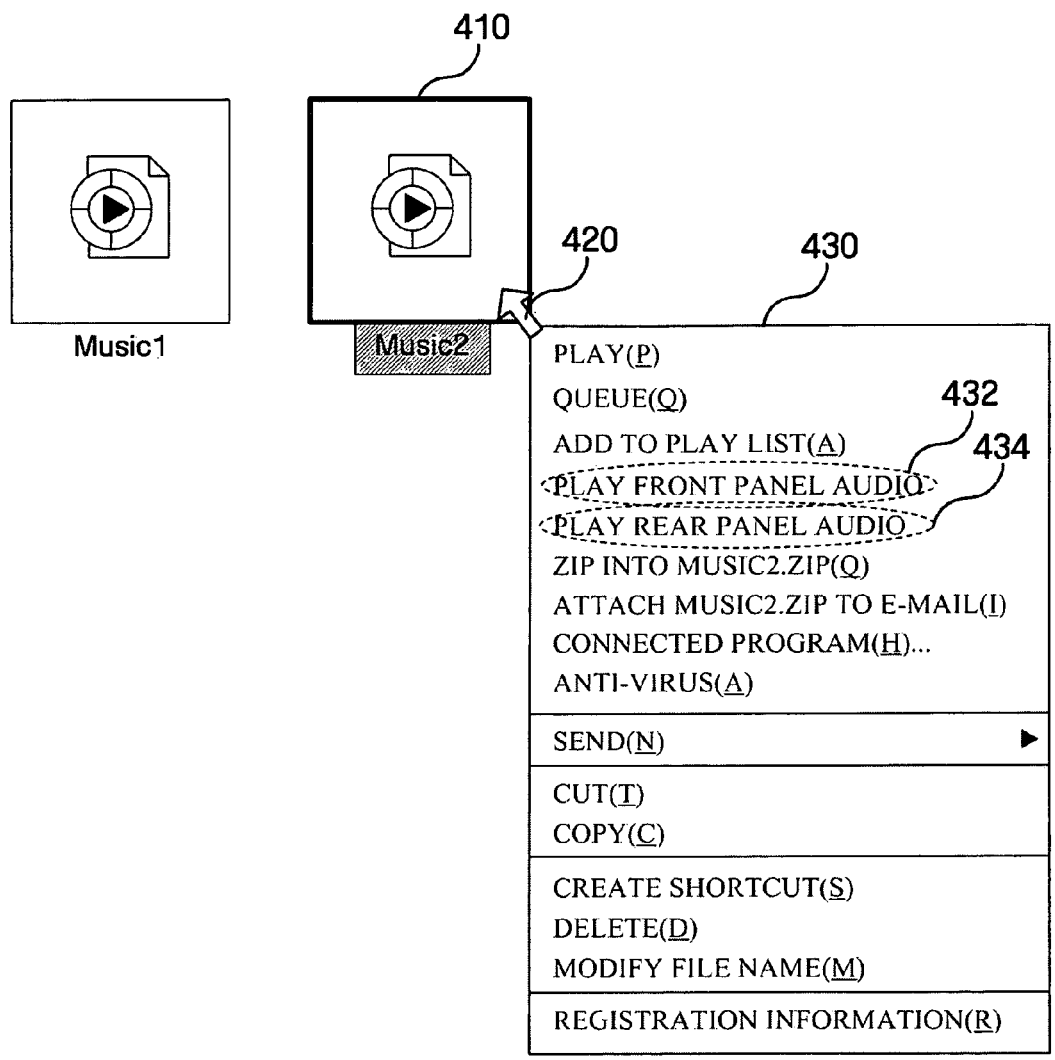
FIG. 4 is a schematic representation of a window popup menu according to an exemplary embodiment of the present invention.

FIG. 4 is a schematic representation of a window popup menu according to an exemplary embodiment of the present invention.

Once the user selects a content icon 410 on the monitor using a mouse cursor 420 and clicks on the content icon 410 using a right mouse button, the computer system (a user interface) provides a window popup menu 430 to the user. However, this implementation is only an example, and the window popup menu 430 can be provided using a left mouse button or a any other button, depending on the settings of the mouse buttons. In an embodiment, the window popup menu 430 shown in FIG. 4 is displayed on a monitor of a computer using Korean Windows XP as an OS.

The window popup menu 430 provides a "play front panel audio" item 432 and a "play rear panel audio" item 434. If the user selects "play front panel audio" 432, content mapped to the content icon 410 is played through a front panel. In other words, an audio signal is transmitted to the front panel. If the user selects "play rear panel audio" 434, content mapped to the content icon 410 is played through a rear panel. One skilled in the art can appreciate that the language of items 432 and 434 is exemplary and is not intended to be limiting.

Figure 5:
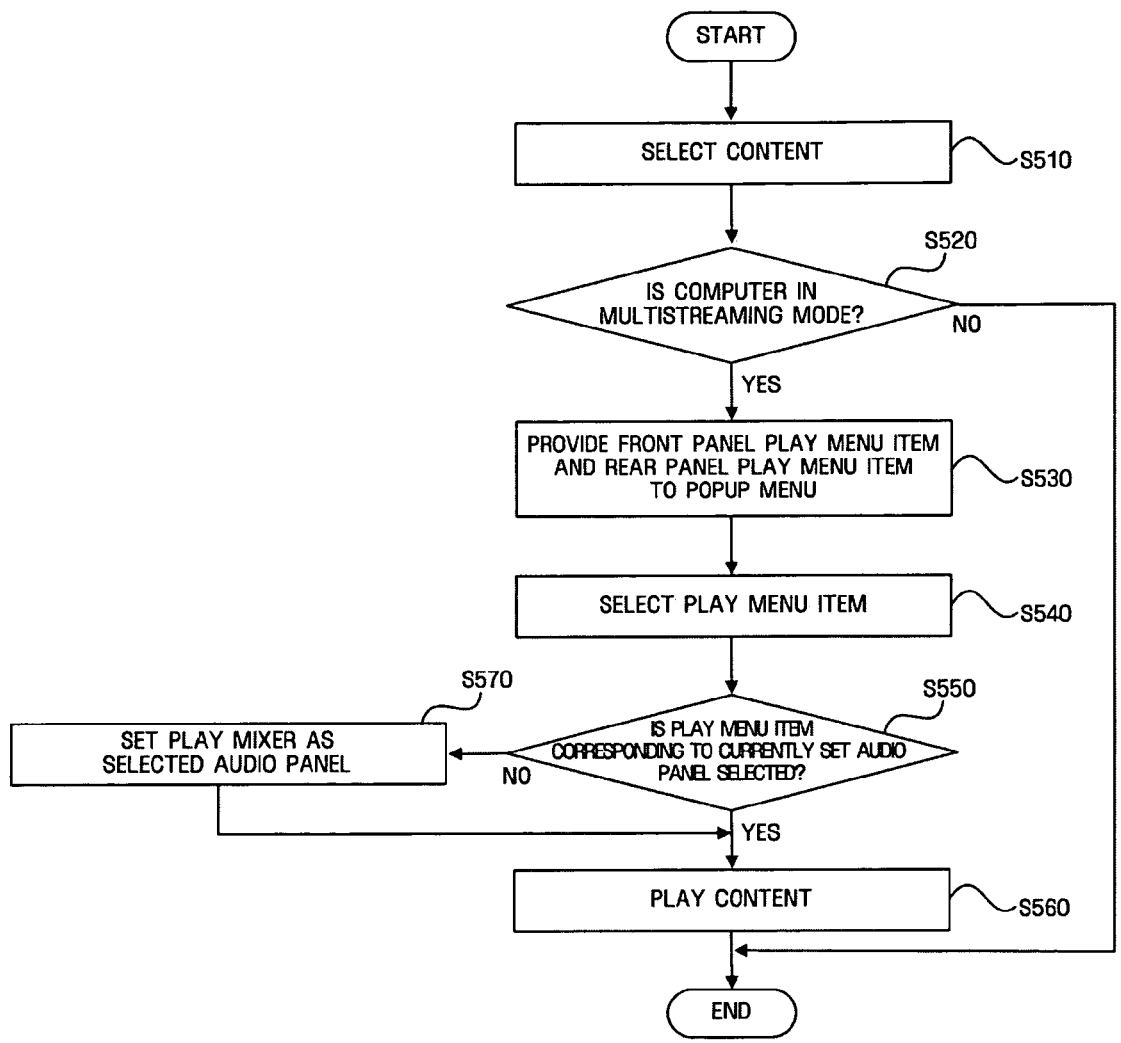
FIG. 5 is a flowchart of the operation of a user interface for multistreaming audio according to an exemplary embodiment of the present invention.

Hereinafter, the operation of a user interface for a multistreaming audio control will be described. FIG. 5 is a flowchart of the operation of a user interface for a multistreaming audio control according to an exemplary embodiment of the present invention.

First, a user selects content in operation S510. The user can select the content by moving a mouse cursor over a content icon and clicking on the content icon using a right mouse button. Once the right mouse button is pressed, a popup menu for the selected content is provided. The user interface determines in operation S520 whether the computer system is in a multistreaming mode. If the computer system is not in a multistreaming mode, the user interface does not operate and a popup menu provided by an OS or other program of a computer is displayed.

If the computer system is in the multistreaming mode, the user interface provides a "play front panel" item and a "play rear panel" item on a popup menu in operation S530.

If the user moves the mouse cursor and selects one of the "play front panel" item and the "play rear panel" item in operation S540, the user interface determines in operation S550 whether a play item corresponding to a currently set audio panel is selected. For example, if the currently set audio panel is the front panel, content is output through the front panel without a need for selection. Once the user selects the play item corresponding to the currently set audio panel, the user interface causes the computer system to play the content through the selected audio panel in operation S560. If the selected audio panel is not a currently set audio panel, a play mixer is set as the selected audio panel in operation S570, and then the user interface causes the computer system to play the content through the selected audio panel in operation S560.

Figure 6:
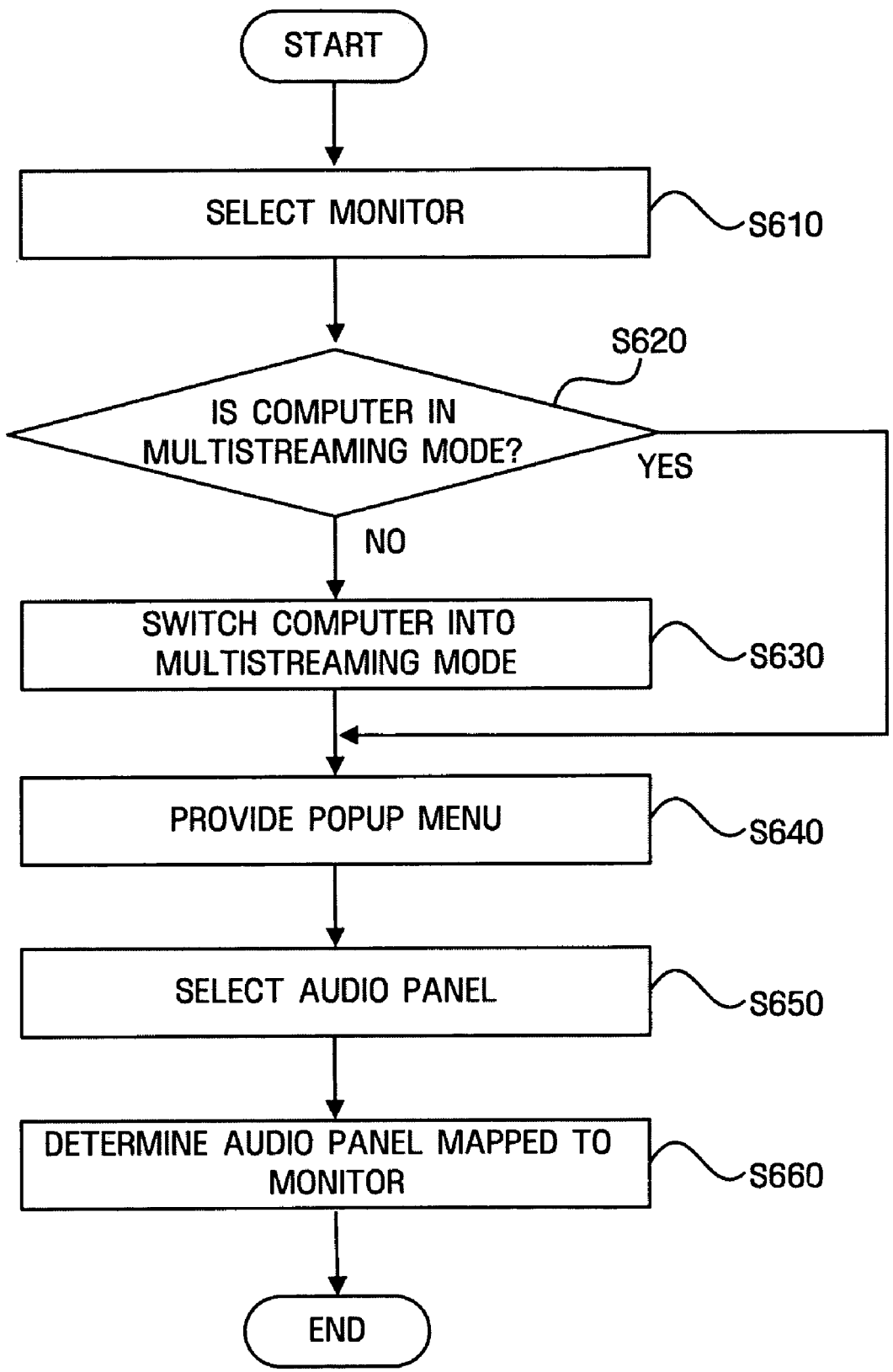
FIG. 6 is a flowchart of a process of setting multistreaming audio for a plurality of monitors according to an exemplary embodiment of the present invention.

FIG. 6 is a flowchart of a process of setting multistreaming audio for a plurality of monitors according to an embodiment of the present invention.

First, the user selects a monitor in operation S610. The user can select a monitor by clicking on a monitor icon using the right mouse button.

The user interface determines whether the computer system is in the multistreaming mode in operation S620. If the computer system is not in the multistreaming mode, the user interface switches a current mode of the computer system to the multistreaming mode in operation S630.

In the multistreaming mode, the user interface, in operation S640, provides a popup menu including audio panel items that can be mapped to monitors. For example, the popup menu may include a front panel item and a rear panel item.

The user selects an audio panel item from the provided popup menu in operation S650, and the user interface determines an audio panel mapped to the selected monitor using the selected audio panel item in operation S660.

The operation of a user interface for the case where the audio panel is mapped to the selected monitor will be described with reference to FIG. 7, which is a flowchart of the operation of a user interface for multistreaming audio control according to another embodiment of the present invention. In this embodiment, the operation of a user interface for multistreaming audio control that can be used in a computer system including a plurality of monitors will be described. The user interface can be used to provide video and audio services to a plurality of locations. For example, to provide video and audio services to two locations, a front panel and a monitor mapped to the front panel are provided in one of the two locations and a real panel and a monitor mapped to the rear panel are provided in the other location.

Figure 7:
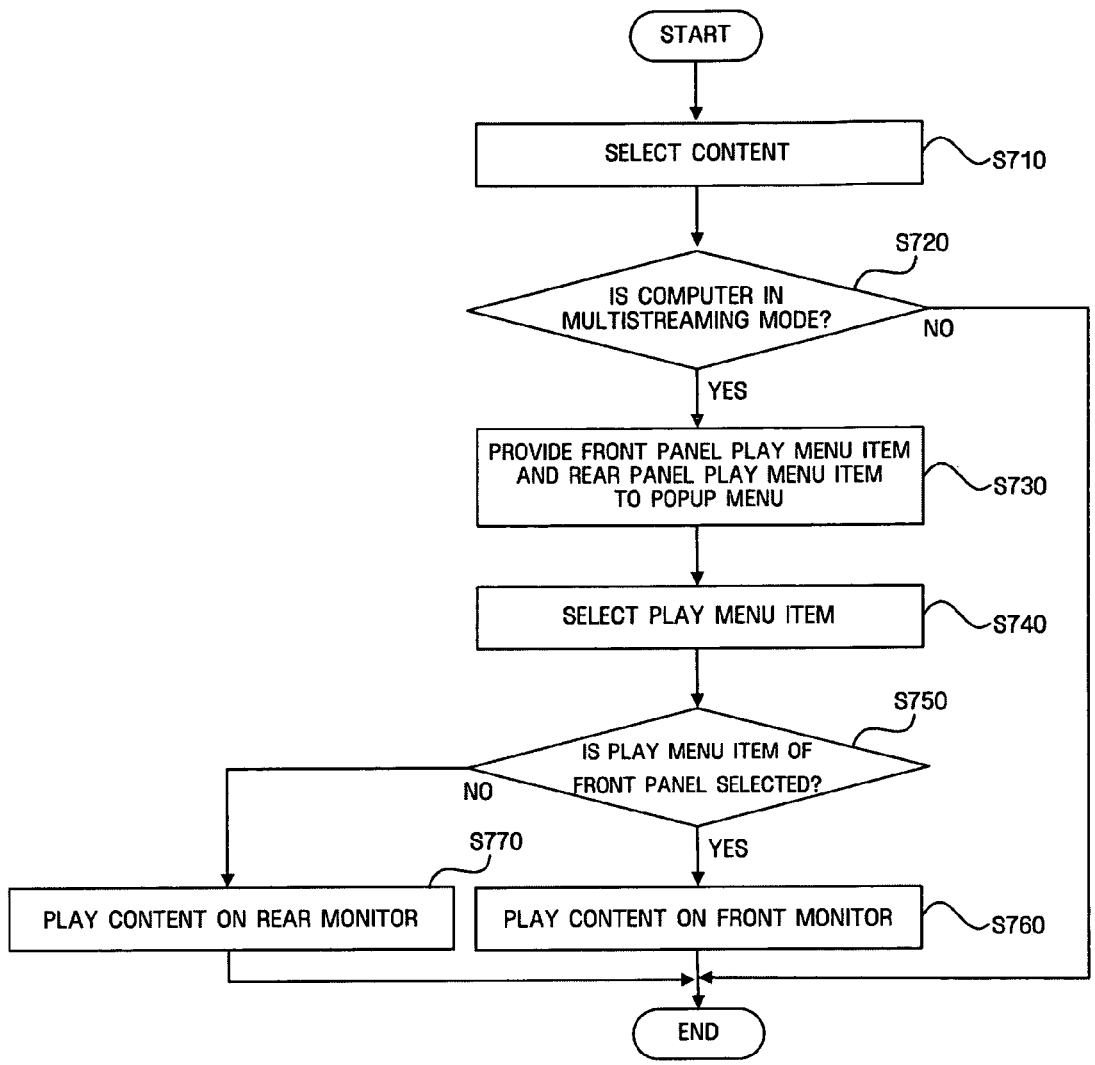
FIG. 7 is a flowchart of the operation of a user interface for multistreaming audio according to another embodiment of the present invention.

Specifically, in FIG. 7, an operation S710 of selecting content, an operation S720 of determining whether a computer system is in a multistreaming mode, an operation S730 of providing a front panel play menu and a rear panel play menu to a popup menu, and an operation S740 of selecting a play menu are the same as in FIG. 5.

Once the user selects a play menu, the user interface determines whether the front panel play menu is selected in operation S750. If the front panel play menu is selected, the user interface causes the computer system to play content on a front monitor in operation S760. If the rear panel play menu is selected, the user interface causes the computer system to play content on a rear monitor in operation S770.

For example, if the user moves a mouse cursor over a movie content icon and then clicks on the movie content icon using a mouse right button, the front panel play menu and the rear panel play menu are displayed on a screen. Once the user selects the front panel play menu, a movie is played on the monitor mapped to the front panel and an audio file is played through the front panel.

Figure 8:
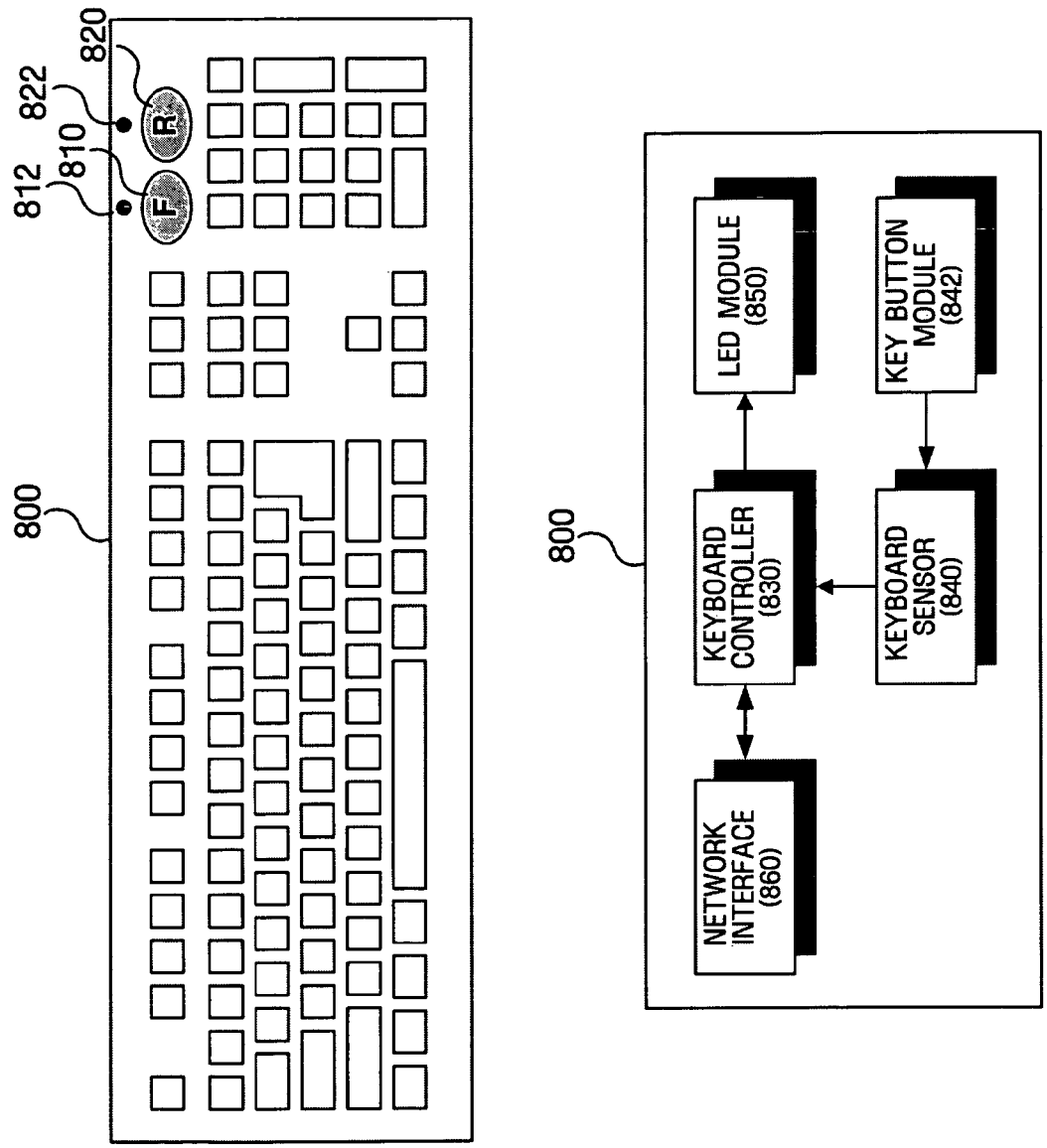
FIG. 8 is a schematic representation and a block diagram of a keyboard according to an exemplary embodiment of the present invention.

As can be understood from the foregoing description, the user interface for multistreaming audio may be provided in the form of not only a popup menu but also hardware, such as through a keyboard. FIG. 8 is a schematic representation and a block diagram of a keyboard according to an embodiment of the present invention.

An upper portion of FIG. 8 illustrates a layout of a keyboard 800. The keyboard 800 includes a plurality of key buttons and hot key buttons 810 and 820 for multistreaming audio control.

The hot key button 810 is used to determine whether to activate the front panel, and the hot key button 820 is used to determine whether to activate the rear panel. The keyboard 800 may further include audio panel lamps 812 and 822 indicating whether a corresponding audio panel is in an active state. For example, when the front panel is in an active state and the rear panel is in an inactive state, the audio panel lamp 812 is turned on and the audio panel lamp 822 is turned off. On the other hand, when the front panel is in the inactive state and the rear panel is in the active state, the audio panel lamp 812 is turned off and the audio panel lamp 822 is turned on. When both the front panel and the rear panel are in the active state, the audio panel lamps 812 and 822 are turned on. When both the front panel and the rear panel are in the inactive state, the audio panel lamps 812 and 822 are turned off.

As an example, the keyboard may include two hot key buttons for controlling two audio panels, or may include hot key buttons for controlling three or more audio panels. In addition, a hot key function can be implemented through a combination of general key buttons without a need for hot key buttons. For example, a hot key function can be implemented by pressing a combination of the Ctr, Alt, and Delete keys, which are presently used in rebooting in a Windows OS.

The keyboard 800 includes a key button module 842, a keyboard sensor 840, a keyboard controller 830, and a network interface 860. The key button module 842 includes a plurality of key buttons and hot key buttons. Once a user presses a key button, the keyboard sensor 840 senses that the key button is pressed and the keyboard controller 830 generates a key signal mapped to the pressed key button. The key signal is transmitted to a computer through the network interface 860. The keyboard 800 receives information about whether a corresponding audio panel is in an active state from the computer and indicates whether a corresponding audio panel is in an active state using a light emitting diode (LED) 850. The network interface 860 can cause the keyboard 800 to communicate with the computer in a wired or wireless manner. The term 'module', as used herein, means, but is not limited to, a software or hardware component, such as a Field Programmable Gate Array (FPGA) or Application Specific Integrated Circuit (ASIC), which performs certain tasks.

Figure 9:
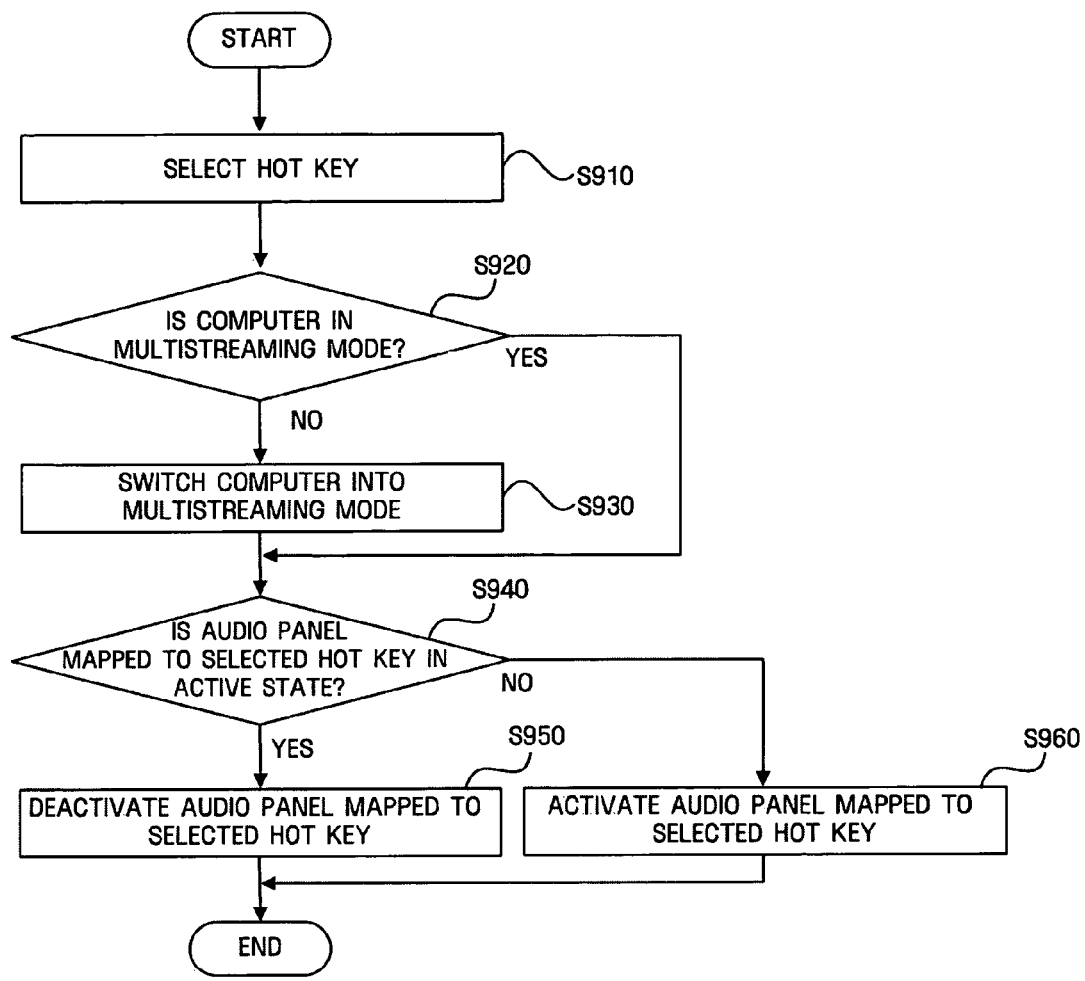
FIG. 9 is a flowchart of the operation of a user interface for multistreaming audio using the keyboard of FIG. 8.

FIG. 9 is a flowchart of the operation of a user interface for multistreaming audio using the keyboard 800 of FIG. 8.

First, the user selects a hot key in operation S910. The user can select a hot key by pressing a hot key button on the keyboard 800.

Once the user selects a hot key, the user interface determines whether the computer is in a multistreaming mode in operation S920. If the computer is not in the multistreaming mode, the user interface switches the computer into the multistreaming mode in operation S930.

In the multistreaming mode, the user interface determines whether an audio panel mapped to the selected hot key is in an active state in operation S940.

If the audio panel mapped to the selected hot key is in the active state, the audio panel mapped to the selected hot key is deactivated in operation S950. At this time, the user interface provides to the keyboard information used by the keyboard to indicate that the audio panel mapped to the selected hot key is in an inactive state.

If the audio panel mapped to the selected hot key is in the inactive state, it is activated in operation S960. At this time, the user interface provides to the keyboard information used by the keyboard to indicate the audio panel mapped to the selected hot key is in the active state.

Figure 10:
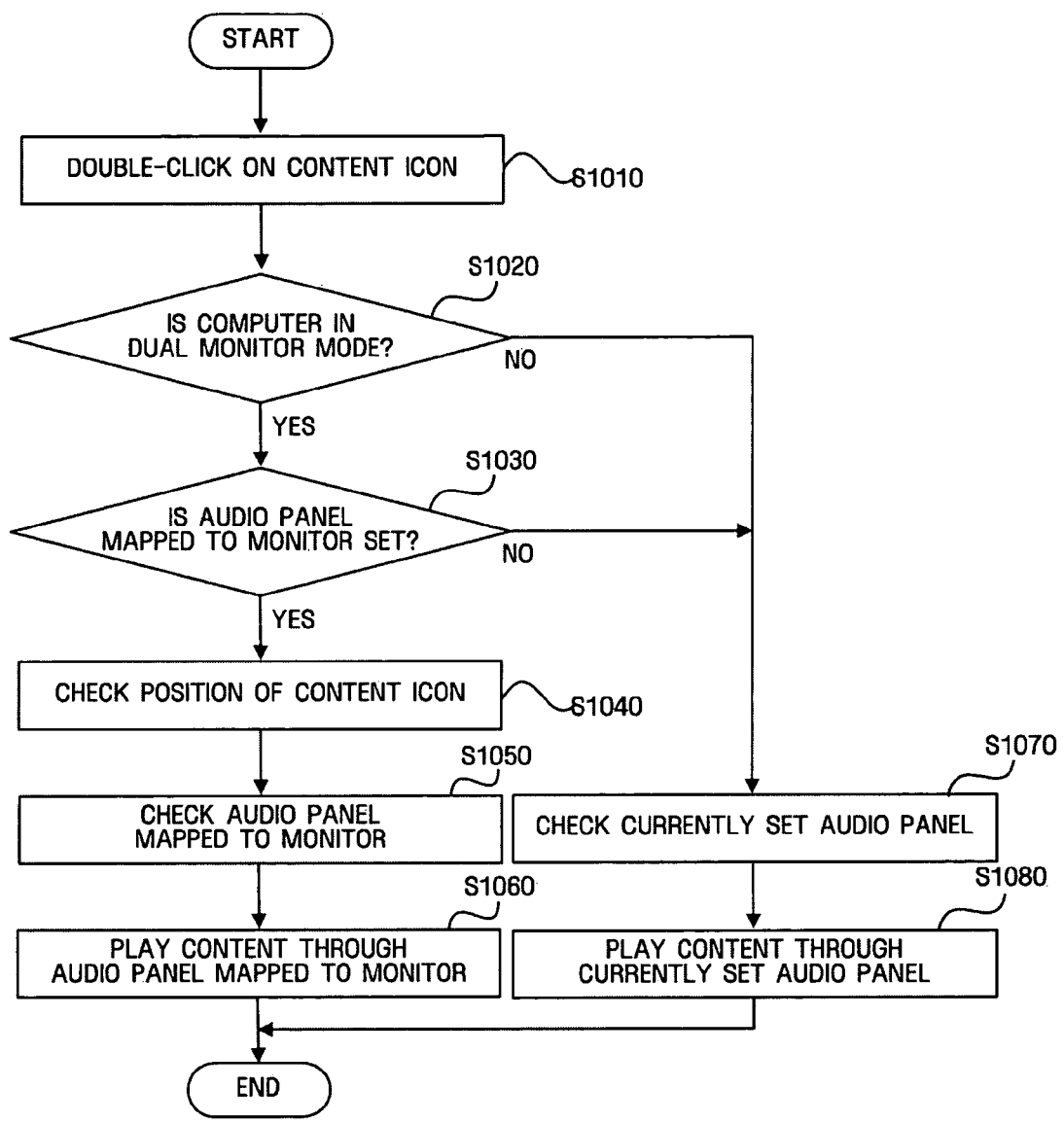
FIG. 10 is a flowchart of a process of playing content according to an exemplary embodiment of the present invention.

FIG. 10 is a flowchart of a method of playing content according to an exemplary embodiment of the present invention.

First, a user double clicks on a content icon in operation S1010. Then the user interface determines whether a computer is in a dual monitor mode in operation S1020. If the computer is not in the dual monitor mode, a currently set audio panel is checked in operation S1070 and content is played through the currently set audio panel in operation S1080.

In the dual monitor mode, the user interface determines whether an audio panel mapped to a monitor is set in operation S1030. If an audio panel mapped to a monitor is not set, operations S1070 and S1080 are performed. If an audio panel mapped to a monitor is set, a position of the content icon is checked in operation S1040. In other words, the user interface determines on which monitor the content icon is displayed.

After checking the position of the content icon, the user interface checks an audio panel mapped to the monitor on which the content icon is displayed in operation S1050. Then, content is played through the audio panel mapped to the monitor in operation S1060. For example, if the audio panel mapped to the monitor is a front panel, the audio of the content is played through the front panel.

According to the present invention, a user can control a multistreaming audio device by merely clicking a mouse button or pressing a hot key without a need for a complicated process.

In addition, a computer system including a plurality of monitors according to the present invention, can establish a relationship between the monitors and audio panels.

Although a few embodiments of the present invention have been shown and described, it would be appreciated by those skilled in the art that changes may be made in these embodiments without departing from the principles and spirit of the invention, the scope of which is defined in the claims and their equivalents.

What is claimed is:

1. A method of providing a user interface for multistreaming audio control, the method comprising:
    determining whether a multistreaming mode of an audio device is activated upon receiving from a user a command to execute a popup menu for content;
    providing a first play menu item of a first audio panel of the audio device to the popup menu for first multi-channel content and providing a second play menu item of a second audio panel of the audio device to the popup menu for second multi-channel content if the multistreaming mode is activated; and
    playing the first multi-channel content through the first audio panel of the audio device when the first play menu item is selected by the user and playing the second multi-channel content through the second audio panel of the audio device when the second play menu item is selected by the user.

2. The method of claim 1, wherein a plurality of different multi-channel audio streams are simultaneously transmitted to different locations from the audio device when the multistreaming mode is activated.

3. The method of claim 1, wherein in the playing of the content, if the selected audio panel is not a currently set audio panel, a play mixer is set as the selected audio panel and the content is played.

4. A method of providing a user interface for multistreaming audio control, the method comprising:
    determining whether a multistreaming mode of an audio device is activated upon receiving from a user a command to execute a popup menu for content;
    providing a first play menu of a first audio panel to the popup menu for first multi-channel content and providing a second play menu item of a second audio panel to the popup menu for second multi-channel content if the multistreaming mode is activated; and
    displaying a play program of the first multi-channel content on a first monitor mapped to a first audio panel selected by the user, and displaying a play program of the second multi-channel content on a second monitor mapped to the second audio panel selected by the user.

5. The method of claim 4, wherein the popup menu for the content provides a first play menu of the first audio panel and the first monitor is mapped to the first audio panel and further provides a second play menu of the second audio panel and the second monitor is mapped to the second audio panel.

6. A method of providing a user interface for multistreaming audio control, the method comprising:
    determining whether a multistreaming mode of an audio device is activated when a user selects a hot key mapped to an audio panel and activating the multistreaming mode of the audio device if the multistreaming mode is determined as inactivated, wherein a plurality of different multi-channel audio streams are simultaneously transmitted to different audio panels of the audio device when the multistreaming mode is activated;
    determining whether the audio panel mapped to the selected hot key that controls the audio panel is in an active state once a user presses the hot key; and
    deactivating the audio panel if the audio panel is in the active state and activating the audio panel if the audio panel is in an inactive state.

7. The method of claim 6, further comprising indicating that the audio panel is in the inactive state if the audio panel is deactivated and indicating that the audio panel is in the active state if the audio panel is activated.

8. A computer readable storage for controlling a computer according to a method of providing a user interface for multistreaming audio control, the method comprising:
    determining whether a multistreaming mode of an audio device is activated upon receiving from a user a command to execute a popup menu for content;
    providing a first play menu item of a first audio panel of the audio device to the popup menu for first multi-channel content providing a second play menu item of a second audio panel of the audio device to the popup menu for second multi-channel content if the multistreaming mode is activated; and
    playing the first multi-channel content through the first audio panel of the audio device when the first play menu item is selected by the user and playing the second multi-channel content through the second audio panel of the audio device when the second play menu item is selected by the user.

9. A computer readable storage for controlling a computer according to a method of providing a user interface for multistreaming audio control, the method comprising:

determining whether a multistreaming mode of an audio device is activated upon receiving from a user a command to execute a popup menu for content;

providing a first play menu of a first audio panel to the popup menu for first multi-channel content and providing a second play menu item of a second audio panel to the popup menu for second multi-channel content if the multistreaming mode is activated; and displaying a play program of the first multi-channel content on a first monitor mapped to a first audio panel selected by the user, and displaying a play program of the second multi-channel content on a second monitor mapped to the second audio panel selected by the user.

10. A computer readable storage for controlling a computer according to a method of providing a user interface for multistreaming audio control, the method comprising:

determining whether a multistreaming mode of an audio device is activated when a user selects a hot key mapped to an audio panel and activating the multistreaming mode of the audio device if the multistreaming mode is determined as inactivated, the activated multistreaming mode providing for simultaneous transmission of a plurality of different audio streams to different audio panels of the audio device;

determining whether the audio panel mapped to the hot key that controls the audio panel is in an active state once a user presses the hot key; and deactivating the audio panel if the audio panel is in the active state and activating the audio panel if the audio panel is in an inactive state.

\* \* \* \* \*